United States Patent
Kudo et al.

(10) Patent No.: US 11,491,954 B2
(45) Date of Patent: Nov. 8, 2022

(54) MOVABLE BODY

(71) Applicant: HONDA MOTOR CO., LTD., Tokyo (JP)

(72) Inventors: Seiji Kudo, Wako (JP); Yuki Oshitani, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 504 days.

(21) Appl. No.: 16/690,478

(22) Filed: Nov. 21, 2019

(65) Prior Publication Data
US 2020/0198583 A1 Jun. 25, 2020

(30) Foreign Application Priority Data

Dec. 21, 2018 (JP) ............................. JP2018-240011

(51) Int. Cl.
*B60S 1/02* (2006.01)
*B60R 11/04* (2006.01)
(Continued)

(52) U.S. Cl.
CPC .......... *B60S 1/023* (2013.01); *B60H 1/00271* (2013.01); *B60H 1/00564* (2013.01);
(Continued)

(58) Field of Classification Search
CPC ............ B60H 1/00271; B60H 1/00564; B60H 1/00785; B60H 1/00878; B60H 1/00842;
(Continued)

(56) References Cited

U.S. PATENT DOCUMENTS 5,096,287 A 3/1992 Kakinami et al.
7,659,827 B2 * 2/2010 Gunderson .............. G08G 1/16
348/148

(Continued)

FOREIGN PATENT DOCUMENTS

JP H02-212241 A 8/1990
JP H03-266739 A 11/1991
(Continued)

OTHER PUBLICATIONS

Japanese Office Action for Japanese Patent Application No. 2018-240011 dated Oct. 4, 2021 (partially translated).

*Primary Examiner* — Ljiljana V. Ciric
(74) *Attorney, Agent, or Firm* — Thomas | Horstemeyer, LLP (57) ABSTRACT

A movable body has a monitoring device that monitors a surrounding environment of the movable body through a window member. The movable body includes a heating device that heats a portion of the window member within a monitoring area of the monitoring device, an air conditioning device, and a control device. The monitoring device includes a detector that detects the surrounding environment, and a base member that faces an inner wall of the window member and is disposed such that a detection surface of the detector is located within a space between the base member and the window member. The space is in communication with the inside of the movable body, and the control device sets the driving force of the air conditioning device to be greater when a decrease in heating performance of the heating device is detected.

3 Claims, 6 Drawing Sheets

(51) Int. Cl.
    *B60H 1/00* (2006.01)
    *B60R 11/00* (2006.01)
(52) U.S. Cl.
    CPC ..... *B60H 1/00785* (2013.01); *B60H 1/00842* (2013.01); *B60H 1/00878* (2013.01); *B60R 11/04* (2013.01); *B60R 2011/0026* (2013.01)
(58) Field of Classification Search
    CPC .............. B60H 2001/003; B60R 11/04; B60R 2011/0026; B60S 1/023; B60S 1/54; B60S 1/026
    See application file for complete search history.

(56) References Cited

U.S. PATENT DOCUMENTS

| | | | | |
|---|---|---|---|---|
| 8,000,894 | B2 * | 8/2011 | Taylor | B60N 2/976 |
| | | | | 362/494 |
| 10,214,157 | B2 * | 2/2019 | Achenbach | B60R 11/04 |
| 10,272,848 | B2 * | 4/2019 | Troxel | H04N 7/188 |
| 10,351,073 | B2 | 7/2019 | Usami et al. | |
| 10,471,905 | B2 * | 11/2019 | Ikeno | B60R 11/04 |
| 2013/0183894 | A1 * | 7/2013 | Watanabe | B60H 3/024 |
| | | | | 454/159 |
| 2013/0273824 | A1 * | 10/2013 | Lang | B60H 1/00271 |
| | | | | 454/141 |
| 2016/0052366 | A1 * | 2/2016 | Hoke | B60H 1/00828 |
| | | | | 219/203 |
| 2017/0036647 | A1 * | 2/2017 | Zhao | B05B 1/04 |
| 2017/0036650 | A1 * | 2/2017 | Hester | B60S 1/52 |
| 2017/0182943 | A1 * | 6/2017 | Hoenninger | B60Q 9/00 |
| 2017/0334364 | A1 | 11/2017 | Usami et al. | |
| 2018/0170354 | A1 * | 6/2018 | Lee | B60W 30/182 |
| 2019/0003895 | A1 * | 1/2019 | Krishnan | G01K 13/02 |
| 2019/0061468 | A1 * | 2/2019 | Reed | B60H 1/00792 |
| 2019/0154799 | A1 * | 5/2019 | Schmidt | G01S 7/4813 |
| 2019/0375269 | A1 * | 12/2019 | Favaretto | B60H 1/262 |
| 2020/0171915 | A1 * | 6/2020 | Sakurai | B60H 1/245 |
| 2020/0198548 | A1 * | 6/2020 | Ohtaki | B60H 1/00849 |
| 2020/0198582 | A1 * | 6/2020 | Kudo | B60H 1/00842 |
| 2020/0198583 | A1 * | 6/2020 | Kudo | B60H 1/00878 |
| 2022/0032724 | A1 * | 2/2022 | Rotenburg | B60H 1/00499 |
| 2022/0144076 | A1 * | 5/2022 | Maddox | B60K 11/06 |

FOREIGN PATENT DOCUMENTS

| | | |
|---|---|---|
| JP | 2001-088611 A | 4/2001 |
| JP | 2014-101004 A | 6/2014 |
| JP | 2017-206098 A | 11/2017 |

* cited by examiner

MOVABLE BODY

CROSS-REFERENCE TO RELATED APPLICATION(S)

This application claims priority to and the benefit of Japanese Patent Application No. 2018-240011 filed on Dec. 21, 2018, the entire disclosure of which is incorporated herein by reference.

BACKGROUND OF THE INVENTION

Field of the Invention

The present invention particularly relates to a movable body that is provided with a monitoring device.

Description of the Related Art

Some vehicles are provided with a camera inside the vehicles, which serves as a monitoring device that can monitor the surrounding environment (see Japanese Patent Laid-Open No. 2017-206098). Such a camera is provided on the side of the inner wall of the windshield, and makes it possible to monitor the outside of the vehicle through the windshield. Japanese Patent Laid-Open No. 2017-206098 discloses that a heater that is constituted by an electric heating wire is provided as a heating device together with a camera, in order to remove fog on the windshield, such as condensation, frost, or ice.

The above-described configuration is desired to be further improved in terms of controllability, in order to effectively remove fog (fog removal) or prevent fog from being generated (fog prevention). The same applies not only to terrestrial vehicles, but also to ships, for example.

SUMMARY OF THE INVENTION

The present invention makes it possible to effectively and relatively easily realize fog removal and fog prevention.

One of the aspects of the present invention provides a movable body comprising a monitoring device configured to monitor a surrounding environment of the movable body through a window member that is light-transmissive and defines the inside and the outside of the movable body, a heating device configured to heat a portion of the window member within a monitoring area of the monitoring device, an air conditioning device configured to perform air conditioning in the movable body, and a control device configured to perform drive control on the heating device and the air conditioning device, wherein the monitoring device includes a detector configured to detect the surrounding environment, and a base member that faces an inner wall of the window member and is disposed such that a detection surface of the detector is located within a space between the base member and the window member, the space is in communication with the inside of the movable body, and when a decrease in heating performance of the heating device is detected, the control device sets the driving force of the air conditioning device to be greater than when a decrease in the heating performance is not detected.

Further features of the present invention will become apparent from the following description of exemplary embodiments with reference to the attached drawings.

DESCRIPTION OF THE EMBODIMENTS

The following describes an embodiment of the present invention with reference to the accompanying drawings. Note that each of the drawings is a schematic diagram showing a structure or a configuration of the embodiment, and each of the members in the drawings is not necessarily drawn to scale. Also, in each of the drawings, the same members or the same constituent elements are assigned the same reference numerals, and descriptions of duplicate contents are omitted. Also, the content of each of the embodiments described below may be applied to other embodiments.

First Embodiment

Figure 1:
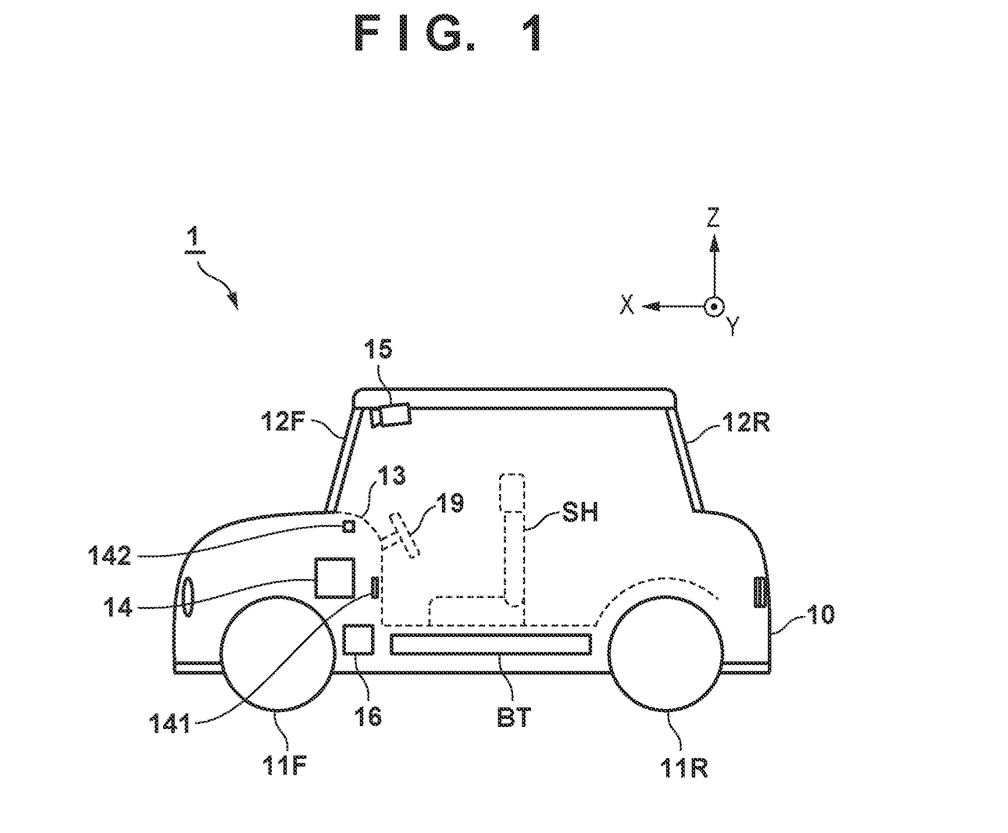
FIG. 1 is a schematic diagram illustrating an example of a configuration of a vehicle according to an embodiment.

FIG. 1 is a schematic diagram showing a vehicle 1 according to an embodiment. In order to facilitate understanding of a structure, an X axis, a Y axis, and a Z axis that are orthogonal to each other are shown in the drawings (the same applies to the other drawings described below). The X direction corresponds to the longitudinal direction of the vehicle body, the Y direction corresponds to the left-right direction of the vehicle body, or the vehicle width direction, and the Z direction corresponds to the height direction of the vehicle body. In the present description, expressions such as front/rear, left/right (side), top/bottom, and inside/outside of the vehicle body (vehicle interior/exterior) indicate a positional relationship relative to a vehicle body 10.

The vehicle 1 is a four-wheeled vehicle that is provided with a pair of left and right front wheels 11F and a pair of left and right rear wheels 11R, but the number of wheels is not limited to four. Also, the vehicle 1 is an electric vehicle that is provided with a battery BT, but may be additionally provided with an internal-combustion engine. A secondary battery such as a lithium ion battery is used as the battery BT, and the battery BT stores electric power that is to be supplied to elements corresponding thereto in the vehicle 1.

The vehicle 1 also includes window members 12F and 12R that define the inside and the outside of the vehicle. The window members 12F and 12R may be constituted by a light-transmissive material (such as glass or resin). In the drawing, the window member 12F is shown as a windshield, a front window, or a front glass, and the window member 12R is shown as a rear window or a rear glass. However, other window members such as a side window or a side glass may also be provided. In this example, a seat SH is shown in the cabin as a driver's seat in order to simplify the drawing. However, other seats may be additionally provided in the cabin.

An operation unit 19 that is used by a user (in particular, a driver) to input a predetermined operation is provided in a cabin front structure 13 that includes a dashboard panel and so on. In the drawing, a steering wheel is shown as a typical example of the operation unit 19. However, the concept of operation that is to be input to the operation unit 19 includes, in addition to a driving operation, related operations that directly/indirectly accompany the driving operation. An example of the related operations is an air conditioning management operation in the cabin.

In addition, as shown in FIG. 1, the vehicle 1 also includes an air conditioning device 14, an electronic component 15, and a control device 16. A well-known configuration may be applied to the air conditioning device 14. For example, the air conditioning device 14 includes an evaporator, a compressor, a condenser, a pipe that connects them and provides a refrigerant flow path, various valves that are provided on the flow path, and so on. The air conditioning device 14 also includes a blower fan that generates a predetermined airflow as conditioned air, a fan motor that drives the blower fan, a heater core that heats the conditioned air, and so on.

The air conditioning device 14 also includes an air conditioner duct 141, a defroster duct 142, and a door mechanism (e.g. a plate door or a rotary door) for switching between them to send out the conditioned air from one of them. The defroster duct 142 is an outlet via which conditioned air is sent out toward the window member 12F/conditioned air is blown against the window member 12F, and a main objective thereof is to perform fog removal/fog prevention on the window member 12F. The air conditioner duct 141 in this example is an outlet other than the above-described defroster duct 142, and a main objective thereof is to perform air conditioning management in the cabin. Therefore, it can be expressed that the air conditioning device 14 includes a cabin blower for sending out air from the air conditioner duct 141, and a fog removal/fog prevention blower (a defroster device) for sending out air from the defroster duct 142. Although the drawing shows a single air conditioner duct 141 that is provided in the cabin front structure 13, a plurality of air conditioner ducts 141 are typically provided so as to be able to send out conditioned air to the user or the surroundings of the user (e.g. rearward or rearward and downward).

The user can activate/deactivate the air conditioning device 14 by inputting an operation to the operation unit 19. The user can select one of the ducts 141 and 142 in the air conditioning device 14 in an active state, from which conditioned air is to be sent out, by inputting an operation to the operation unit 19. For example, the user can input a predetermined operation to the operation unit 19 so that conditioned air is sent out from one or both of the ducts 141 and 142. Also, the driving force of the air conditioning device 14 (the amount of conditioned air) can be adjusted by the user inputting an operation to the above-described operation unit 19, and can also be adjusted by the control device 16 executing a predetermine program, the details of which will be described below.

Figure 2A:
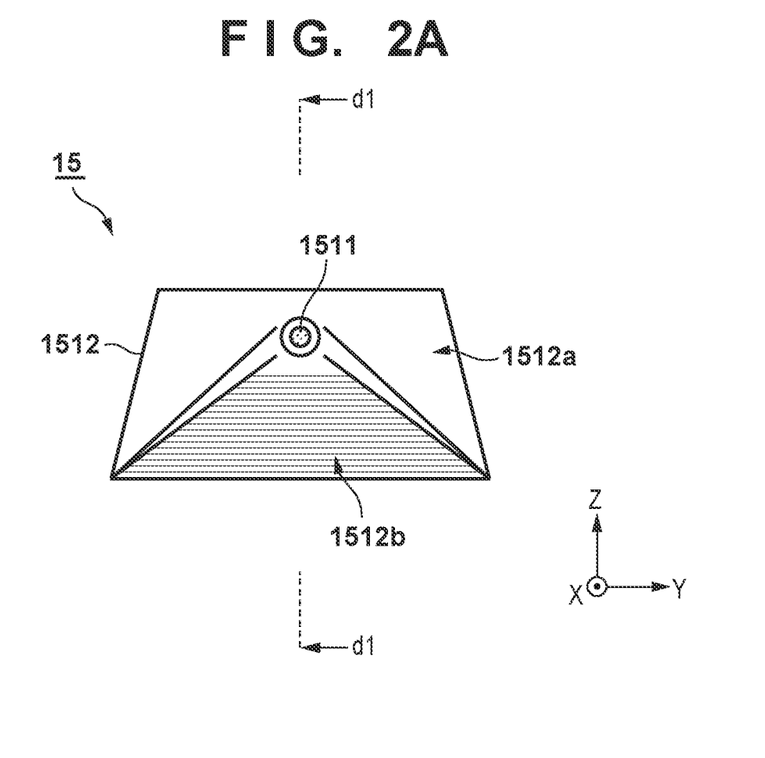
FIG. 2A is a schematic diagram illustrating an example of a configuration of an on-board electronic component.
Figure 2B:
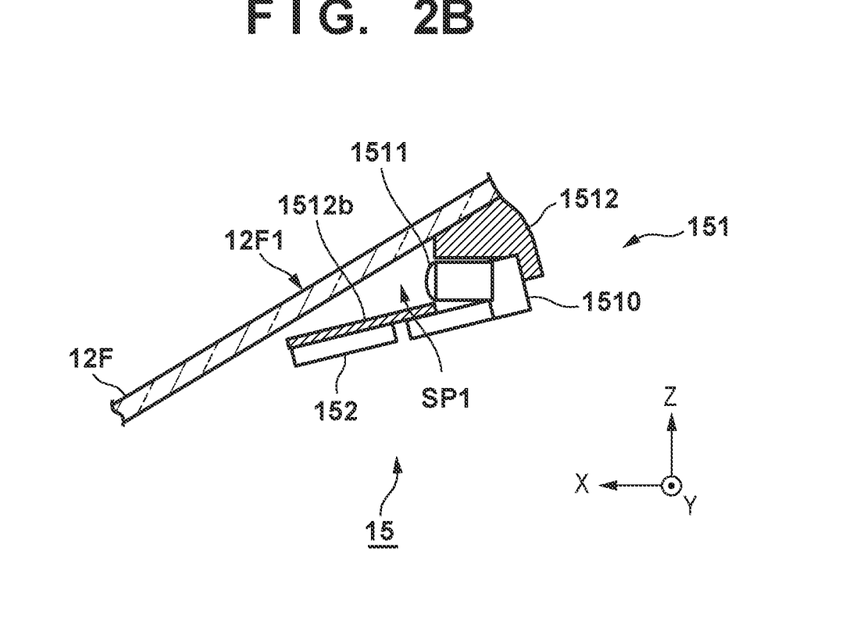
FIG. 2B is a schematic diagram illustrating an example of a configuration of an on-board electronic component.

FIG. 2A is a front view showing a configuration of the electronic component 15. FIG. 2B is a cross-sectional view of the electronic component 15 taken along a cutting line di-di in FIG. 2A. The electronic component 15 includes a monitoring device 151 that can monitor the surrounding environment of the self-vehicle through the window member 12F and a heating device 152 that can heat the window member 12F, and the electronic component 15 is provided in the vicinity of the inner wall (the surface inside the vehicle) of the window member 12F.

A camera that can capture an image of the above-described surrounding environment can be used as the monitoring device 151. In the present embodiment, the monitoring device 151 includes a device body 1510, a detector 1511, and a base member 1512. A well-known imaging sensor such as a CCD/CMOS image sensor is used as the detector 1511, and the detector 1511 makes it possible to detect or capture an image of the above-described surrounding environment (in the present embodiment, the environment in front of the vehicle 1). A processor that processes the result of detection performed by the detector 1511 is built into the device body 1510, and the result of processing performed by the processor is output to the control device 16 described below as image data.

The base member 1512 is a bracket for fixing the above-described device body 1510 and detector 1511 to the vehicle body 10, and fixing the heating device 152 described below. The base member 1512 includes an abutting portion 1512a and a recessed portion 1512b. The abutting portion 1512a abuts against the inner wall of the window member 12F, and is fixed to the window member 12F using an adhesive, for example.

The recessed portion 1512b is recessed in the abutting portion 1512a, and has a substantially triangular or trapezoidal shape in a top view or a front view thereof. An opening is provided at the rear end of the recessed portion 1512b, through which the detection surface of the detector 1511 is exposed to the outside. That is to say, the recessed portion 1512b of the base member 1512 faces the inner wall of the window member 12F, a space SP1 is formed between the base member 1512 and the window member 12F. The detection surface of the detector 1511 is located in the space SP1. As can be seen from FIG. 2B, the space SP1 is formed so as to narrow in a direction from the rear side to the front side in side view.

With such a configuration, and the monitoring device 151 can monitor the surrounding environment (in the present embodiment, the environment in front of the vehicle 1) through the window member 12F. Note that surface treatment may be applied to the upper surface of the recessed portion 1512b in order to prevent light reflection.

A portion of the window member 12F located in the monitoring area (and the neighboring area thereof) of the monitoring device 151 is referred to as a portion 12F1. In the present embodiment, the portion 12F1 corresponds to a portion that is forward of, and upward of, the above-described space SP1. Here, as described above, an opening, through which the detection surface of the detector 1511 is exposed to the outside, is provided in a rear portion of the recessed portion 1512b. Also, as can be seen from FIG. 2B, a gap (approximately 0.1 cm to approximately 1.0 cm) is formed between the front end of the recessed portion 1512b and the window member 12F. Therefore, the above-described space SP1 is substantially not sealed, and is in communication with the inside of the vehicle.

However, the space SP1 is surrounded by the window member 12F and the base member 1512, and therefore, in such a space SP1, a gas (air) is likely to stop flowing, and fog may be likely to be generated on the above-described portion 12F1, depending on the environment (in particular, the temperature and the humidity in the vehicle 1). Typically, such fog is generated as a result of water droplets or the like adhering to the portion 12F1 when the humidity in the cabin is relatively high and the temperature of the window member 12F is relatively low.

The heating device 152 is provided on the recessed portion 1512b of the base member 1512, and heats the above-described portion 12F1 via the gas (air) in the space SP1. Additionally, when the air conditioning device 14 is in an active state, a gas that flows into the space SP1 through the gap between the front end of the recessed portion 1512b and the window member 12F is heated by the heating device 152, and thus heats the above-described portion 12F1. In this way, the heating device 152 removes fog on the above-described portion 12F1, and/or prevents fog from being generated on the above-described portion 12F1 (this may be simply referred to as "fog removal/prevention" in the present description). The heating device 152 need only be configured to be able to generate a desired amount of heat. In the present embodiment, an electric heating wire that is built into the recessed portion 1512b, and a heater driver that energize the electric heating wire to generate heat, are used. The heater driver supplies the electric heating wire with a current that is based on electric power from the battery BT.

Here, if the driving force of the air conditioning device 14 (the amount of conditioned air) is increased, the amount of gas flowing into the space SP1 increases. Also, if the driving force of the heating device 152 (the amount of heat generation) is increased, the above-described portion 12F1 of the window member 12F is quickly heated via the space SP1. Therefore, from the viewpoint of fog removal/fog prevention, it can be summarized that fog removal/fog prevention can be more effectively realized by increasing the driving force of the air conditioning device 14 and/or the heating device 152.

The control device 16 in the present embodiment is an ECU (electronic control unit) that includes a CPU (central processing unit), a memory, and an external communication interface, and performs drive control on each element of the vehicle 1 based on a predetermined program. In another embodiment, a semiconductor device such as a PLD (programmable logic device) or an ASIC (application specific integrated circuit) may be used as the control device 16. That is to say, the functions of the control device 16 described in the present description can be realized by either hardware or software.

Figure 3:
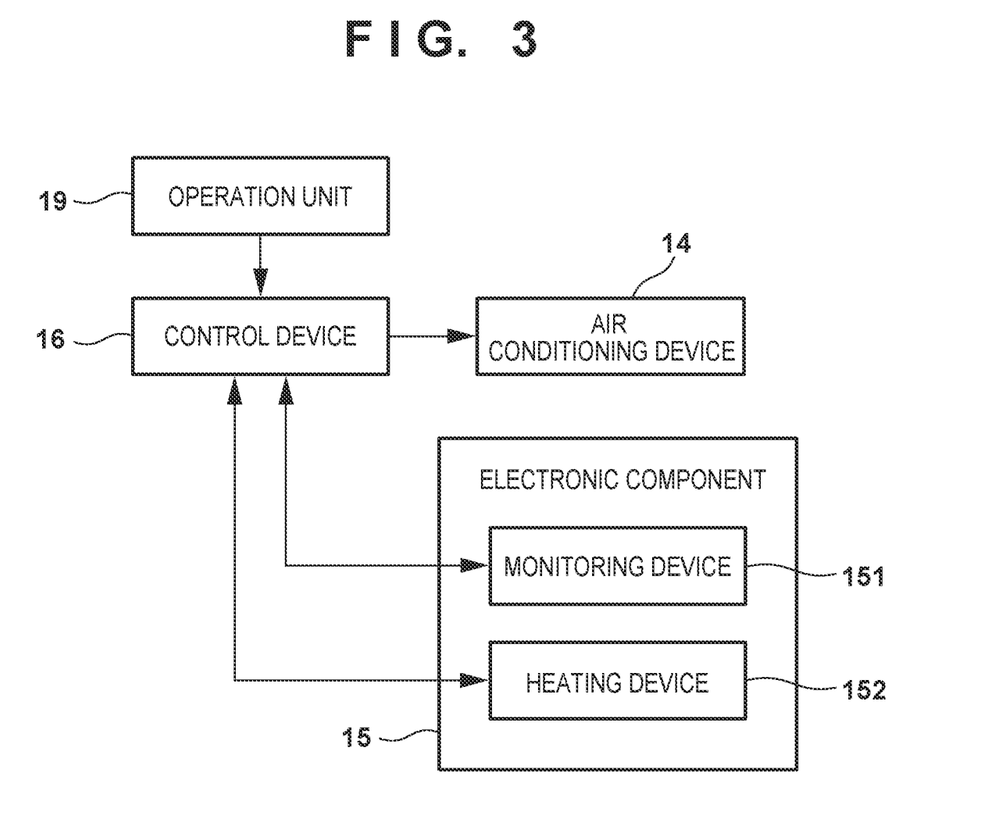
FIG. 3 is a block diagram illustrating an example of a configuration of a portion of a vehicle.

FIG. 3 is a block diagram showing a portion of the system configuration of the vehicle 1. The control device 16 transmits/receives signals to/from several elements included in the vehicle 1, and performs drive control on the elements based on an operation input by the user to the operation unit 19, for example.

For example, the control device 16 performs drive control on the air conditioning device 14. This drive control includes adjustment of the driving force of the air conditioning device 14 (the amount of conditioned air), for example. The drive control is performed based on an operation input by the user to the operation unit 19, and is also performed based on a predetermined program described below. Note that adjustment of the driving force can be realized by changing the number of rotations of the blower fan, for example.

Also, the control device 16 receives information (image data in the present embodiment) indicating the above-described surrounding environment from the monitoring device 151, and performs predetermined driving assistance based on the information. Driving assistance mentioned above is a concept that includes not only the provision of necessary/useful information for driving to the driver, but also so-called automated driving, i.e. at least one of the drive operations (typically, acceleration, braking, and steering) is performed by the control device 16, not by the driver.

Also, the control device 16 performs drive control on the heating device 152. The heating device 152 is driven by the control device 16 upon predetermined conditions being satisfied. However, the heating device 152 may be additionally driven based on an operation input by the user to the operation unit 19.

Although details will be described later, the control device 16 can also evaluate whether or not the heating performance of the heating device 152 satisfies a criterion, and receives a signal indicating the result of the evaluation from the heating device 152. The above-described evaluation of heating performance is performed by driving the heating device 152, for example, and may be performed in response to a request from the control device 16, or performed at predetermined intervals.

To simplify this description, the control device 16 is illustrated as a single unit in FIG. 3. However, in many cases, the control device 16 is constituted by a plurality of ECUs that are provided so as to be able to communicate with each other, and the plurality of ECUs may be provided at their respective positions in the vehicle body 10. Also, each ECU may be constituted by one or more electrical components mounted on a mounting board.

Figure 4:
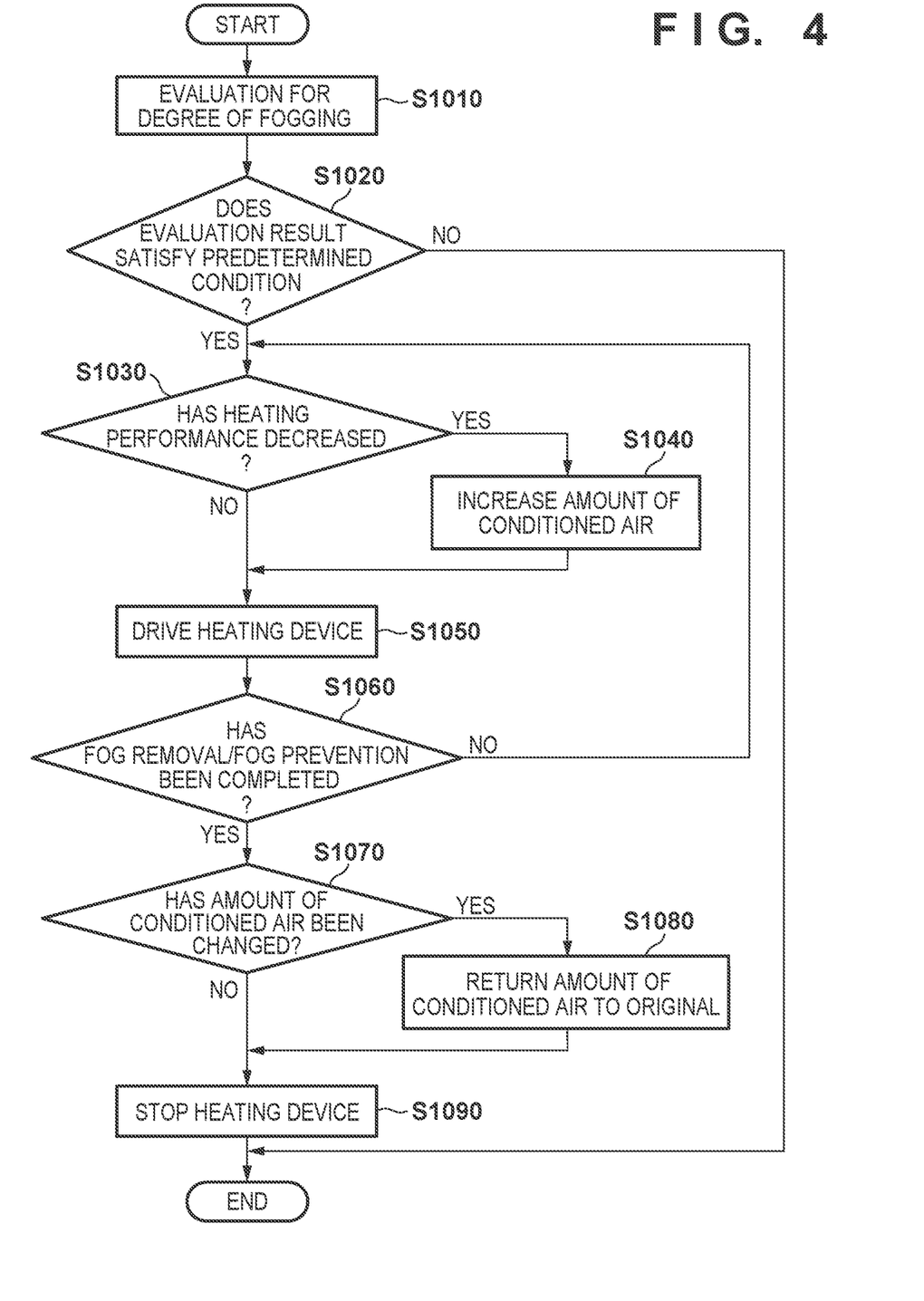
FIG. 4 is a flowchart illustrating an example of the content of control that is performed by a control device.

FIG. 4 is a flowchart showing an example of the content of control that is performed by the control device 16. In short, in this flowchart, the heating device 152 is driven based on the result of the evaluation regarding the degree of fogging on the window member 12F, and if a decrease in the heating performance of the heating device 152 is detected, the driving force of the air conditioning device 14 is increased. These operations are mainly performed by the CPU in the control device 16, executing a predetermined program.

In step S1010 (hereinafter simply referred to as "S1010". The same applies to the other steps.), the degree of fogging on the portion 12F1 of the window member 12F is evaluated. This evaluation includes not only an evaluation of the degree of actual fogging present at the time of the evaluation (whether or not fog is actually present), but also an evaluation or prediction of the degree of fogging in the relatively near future (whether or not there will be fog in the relatively near future). These evaluations may be realized using a well-known method. For example, the degree of fogging can be evaluated by performing a predetermined image analysis on image data that is the result of monitoring performed by the monitoring device 151. Also, the degree of fogging in the relatively near future can be evaluated based on the temperature outside the vehicle and/or the humidity in the vehicle.

In S1020, whether or not the result of the evaluation in S1010 satisfies predetermined conditions is determined. If it has been determined that there is the possibility that fog is actually present/fog may be present in the relatively near future based on the result of the evaluation in S1010, processing proceeds to S1030. On the other hand, if it has not been determined that fog is actually present/fog may be present in the relatively near future, the flowchart is terminated.

In S1030, whether or not the heating performance of the heating device 152 has decreased is determined. If the heating performance of the heating device 152 has decreased, processing proceeds to S1040, and the driving force of the air conditioning device 14 (the amount of conditioned air) is increased in S1040. Thereafter, processing proceeds to S1050. On the other hand, if the heating performance of the heating device 152 has not decreased, processing proceeds to S1050 without change.

Here, evaluation of the heating performance of the heating device 152 is performed by the heating device 152 as described above, and the result of the evaluation is transmitted from the heating device 152 to the control device 16. This evaluation may be performed using a well-known method. In the present embodiment in which the heating device 152 is constituted by an electric heating wire built into the recessed portion 1512b, one example of the evaluation method is to supply a predetermined current to the electric heating wire and determine whether or not the amount of heat accordingly generated by the electric heating wire is greater than a reference value. Another example of the evaluation method is to supply a predetermined voltage to the above-described electric heating wire and determine whether or not the current flowing at the time is greater than a reference value.

In S1050, the heating device 152 is driven. As a result, the space SP1 is heated, the portion 12F1 of the window member 12F is accordingly heated, and thus fog removal/fog prevention is performed. Here, if the driving force of the air conditioning device 14 has been increased in S1040, a large amount of air flows into the space SP1, and therefore fog removal/fog prevention is more effectively performed.

In S1060, whether or not fog removal/fog prevention has been completed is determined. This determination may be performed using the same method as in the above-described S1010, for example, or performed based on the time elapsed after the driving of the heating device 152 has been started. The elapsed time may be a constant value, or a variable value that is based on the temperature outside the vehicle/the humidity in the vehicle. If fog removal/fog prevention has been completed, processing proceeds to S1070, and otherwise processing returns to S1030.

In S1070, whether or not the driving force of the air conditioning device 14 has been changed in S1030 to S1040 is determined. If the driving force of the air conditioning device 14 has been changed, processing proceeds to S1080, and the driving force is returned to the original. Thereafter, processing proceeds to S1090. On the other hand, if the driving force of the air conditioning device 14 has not been changed, processing proceeds to S1090 without change.

In S1090, the heating device 152 is stopped (is restricted from driving), and the flowchart is terminated. Generally, the window member 12F may include a heat-insulating layer as an intermediate layer, and therefore, once the inner wall of the window member 12F has been heated, the above-described fog is unlikely to be generated. Therefore, S1080 (returning the driving force to the original) and S1090 (stopping the heating device 152) may be performed immediately after fog removal/fog prevention has been completed.

On the other hand, in another embodiment, S1090 may be omitted after fog removal/fog prevention has been completed (the heating device 152 may be kept in a driving state). As a result, the effect of fog prevention by the heating device 152 continues.

Note that the above-described flowchart may be partially modified so as not to depart from the spirit thereof. For example, another step may be added, or the order of the steps may be changed.

According to the above-described control, if a decrease in the heating performance of the heating device 152 is detected, the driving force of the air conditioning device 14 (the amount of conditioned air), and thus the amount of air flowing to the space SP1 is increased. As a result, the retention of air in the space SP1 is resolved, and even if the heating performance of the heating device 152 decreases to a value that is lower than or equal to a reference value, fog removal/fog prevention can be effectively and relatively easily performed on the window member 12F. Also, during a period in which the heating performance of the heating device 152 satisfies a criterion, there is no possibility that the air conditioning device 14 is unnecessarily driven. Therefore, the occupant will feel virtually no discomfort. If the driving force of the air conditioning device 14 has been changed, the driving force is returned to the original upon fog removal/fog prevention being complete (S1080), and therefore it is possible to perform air conditioning without causing the user discomfort.

In many cases, operation modes of the air conditioning device 14 may include an internal air circulation mode (a mode in which the air conditioning device 14 circulates the air inside the vehicle to perform air conditioning) and an external air introduction mode (a mode in which the air conditioning device 14 takes the air outside the vehicle into the vehicle to perform air conditioning). Although the above-described control performed by the control device 16 in the present embodiment may be employed in either the internal air circulation mode or the external air introduction mode, the external air introduction mode is preferably employed to more effectively realize the above-described fog removal/fog prevention.

In the embodiment, a camera is given as a preferable example of the monitoring device 151. However, the content of the embodiment is also applicable to other devices that are provided with a monitoring function. For example, fog on the window member 12F (such as water droplets adhering to the inner wall) changes the refraction index, which may cause a change in the monitoring area of the monitoring device 151. Therefore, the monitoring device 151 may be a radar (millimeter wave radar) or a LiDAR (Light Detection and Ranging). Also, the monitoring device 151 may be configured to monitor an area on the rear side or lateral side of the vehicle 1. For example, the content of the embodiment is also applicable to fog removal/fog prevention that is performed on the window member 12R.

Second Embodiment

It is stated in the above first embodiment that the driving force of the air conditioning device 14 (the amount of conditioned air) is increased if a decrease in the heating performance of the heating device 152 is detected. As described above (see FIG. 1), the air conditioning device 14 includes the air conditioner duct 141 and the defroster duct 142. The effect of fog removal/fog prevention performed on the window member 12F can be improved by increasing the amount of air from either the duct 141 or 142. However, generally, air from the defroster duct 142 more effectively realizes fog removal/fog prevention. The second embodiment is different from the first embodiment mainly in that the air conditioning device 14 is controlled so as to send out air from the defroster duct 142 when fog removal/fog prevention is to be performed (see S1010 to S1020 in FIG. 4).

In the following description, an operation mode in which conditioned air is sent out from the duct 141 of the above-described ducts 141 and 142 is expressed as "an A/C mode", and an operation mode in which conditioned air is sent out from the duct 142 is expressed as "a defroster mode". In order to simplify this description, the following describes the aforementioned two modes as examples. However, there may be a mode in which conditioned air is sent out from both of the ducts 141 and 142 as another mode.

Figure 5A:
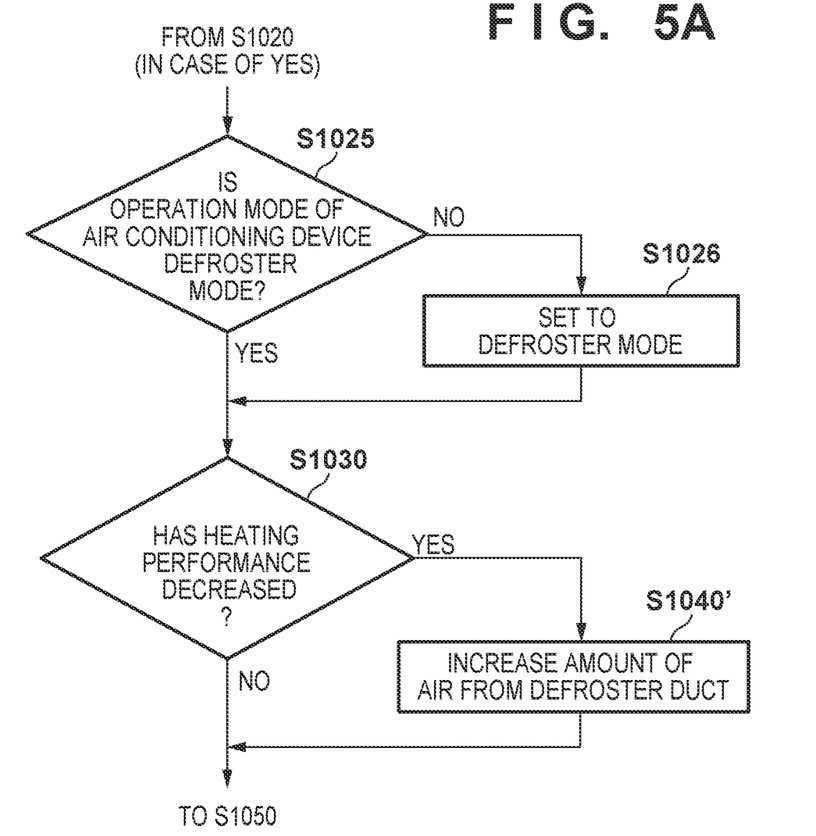
FIG. 5A is a flowchart illustrating an example of the content of control that is performed by a control device.
Figure 5B:
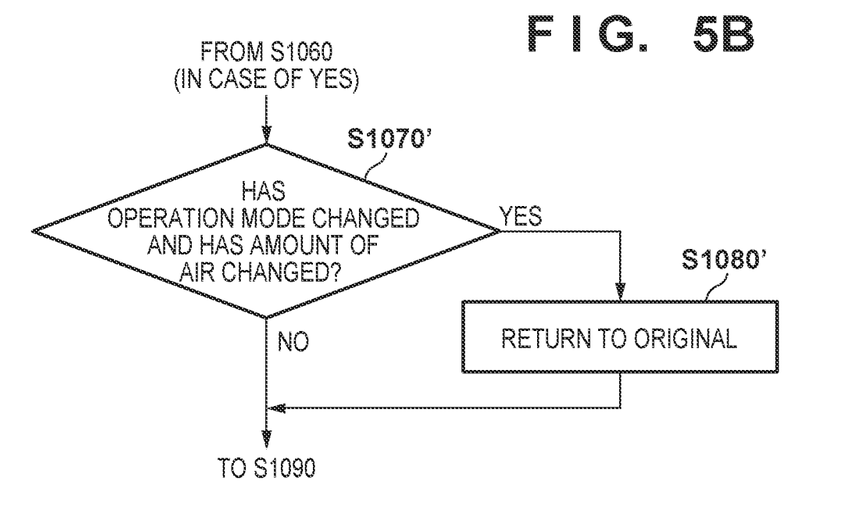
FIG. 5B is a flowchart illustrating an example of the content of control that is performed by the control device.

FIGS. 5A and 5B are portions of a flowchart that shows an example of the content of control that is performed by the control device 16 according to the present embodiment.

S1020 and the preceding steps are the same as those in the first embodiment (see FIG. 4).

As shown in FIG. 5A, if it is determined in S1020 that fog is actually present/there is the possibility of fog being generated in the relatively near future, processing proceeds to S1025. In S1025, whether or not the operation mode of the air conditioning device 14 is the defroster mode is determined. If the operation mode is not the defroster mode, processing proceeds to S1026, and the operation mode of the air conditioning device 14 is changed to the defroster mode in S1026. Thereafter, processing proceeds to S1030. Note that if the air conditioning device 14 is in an inactive state when the determination is performed, the air conditioning device 14 transitions to an active state in the defroster mode. On the other hand, if the operation mode is already the defroster mode, processing proceeds to S1030 without change.

In S1030, whether or not the heating performance of the heating device 152 has decreased is determined. If the heating performance of the heating device 152 has decreased, processing proceeds to S1040', and the amount of air from the defroster duct 142 is increased in S1040'. Thereafter, processing proceeds to S1050. On the other hand, if the heating performance of the heating device 152 has not decreased, processing proceeds to S1050 without change. S1050 to S1060 are the same as those in the first embodiment.

As shown in FIG. 5B, if it is determined in S1060 that fog removal/fog prevention has been completed, processing proceeds to S1070'. In S1070', whether or not the operation mode has been changed in S1025 to S1026 and whether or not the amount of air from the defroster duct 142 has been changed in S1030 to S1040' are determined. If either one or both of the operation mode and the amount of air has/have been changed, processing proceeds to S1080', and the one or both of them is/are returned to the original(s) in S1080'. Thereafter, processing proceeds to S1090. On the other hand, if none of them has been changed, processing proceeds to S1090 without change. S1090 is the same as that in the first embodiment.

Through such control, when fog removal/fog prevention is to be performed, the air conditioning device 14 is set to the defroster mode regardless of which operation mode the air conditioning device 14 is in, and air is sent out from the defroster duct 142. If a decrease in the heating performance of the heating device 152 is detected, the amount of air from the defroster duct 142 is increased, and thus the amount of air flowing into the space SP1 is increased. In the defroster mode, conditioned air from the defroster duct 142 is sent out toward the window member 12F. Therefore, the conditioned air can travel along the inner wall of the window member 12F and reach the electronic component 15, and a larger amount of air flows into the space SP1 compared to when the operation mode is the A/C mode. Therefore, the present embodiment can achieve the same effect as, or a greater effect than, the first embodiment. Also, if either one or both of the operation mode of the air conditioning device 14 and the amount of air has/have been changed, the one or both of them is/are returned to the original(s) (S1080'). Therefore, it is possible to perform air conditioning without causing the user discomfort.

In the present embodiment, two operation modes, namely the A/C mode and the defroster mode, are described as examples of the operation modes of the air conditioning device 14. However, as described above, there may be a mode in which conditioned air is sent out from both of the ducts 141 and 142 as another mode. In such a case, in S1025, whether or not the operation mode of the air conditioning device 14 is closer to the defroster mode relative to a criterion may be determined. In S1040, the operation mode is changed such that the proportion of the amount of air from the defroster duct 142 to the amount of air from the air conditioner duct 141 after the change will be greater than that before the change. That is to say, the operation mode is to be changed such that the operation mode after the change will be closer to the defroster mode than the operation mode before the change is.

Third Embodiment

It is stated in the above second embodiment that the air conditioning device 14 is set to the defroster mode to realize fog removal/fog prevention. However, air from the defroster duct 142 may cause the occupant discomfort due to noise or the like caused by the air. Therefore, in the case where it is determined in S1010 (see FIG. 4) that fog removal/fog prevention needs to be performed, if the user does not use/permit the defroster mode, the operation mode is changed to the defroster mode under the condition that the heating performance of the heating device 152 has decreased. That is to say, if a decrease in the heating performance of the heating device 152 has not been detected (if the heating performance satisfies a criterion), the defroster duct 142 is restricted from sending out air.

Figure 6A:
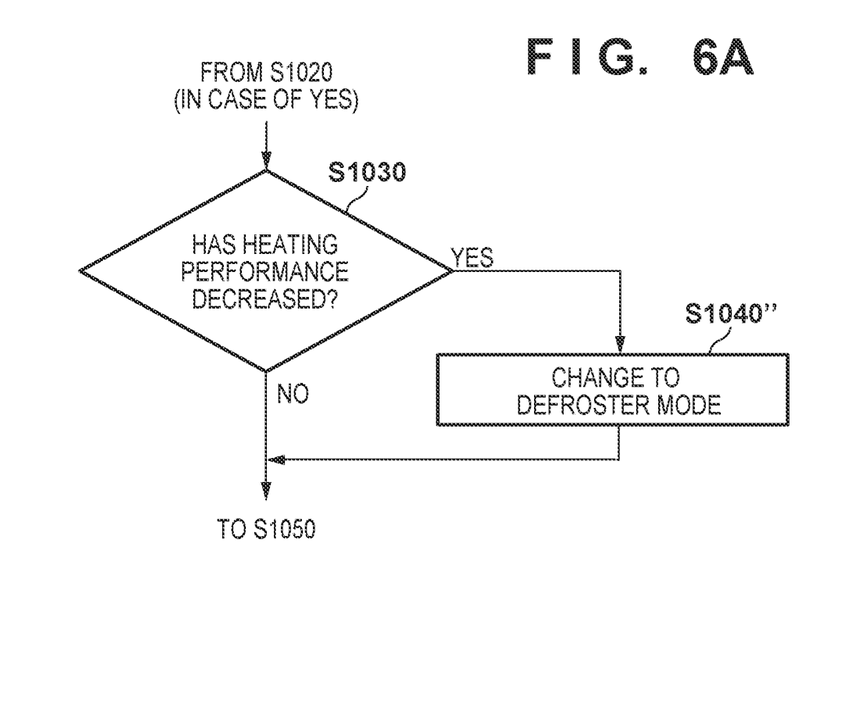
FIG. 6A is a flowchart illustrating an example of the content of control that is performed by the control device.
Figure 6B:
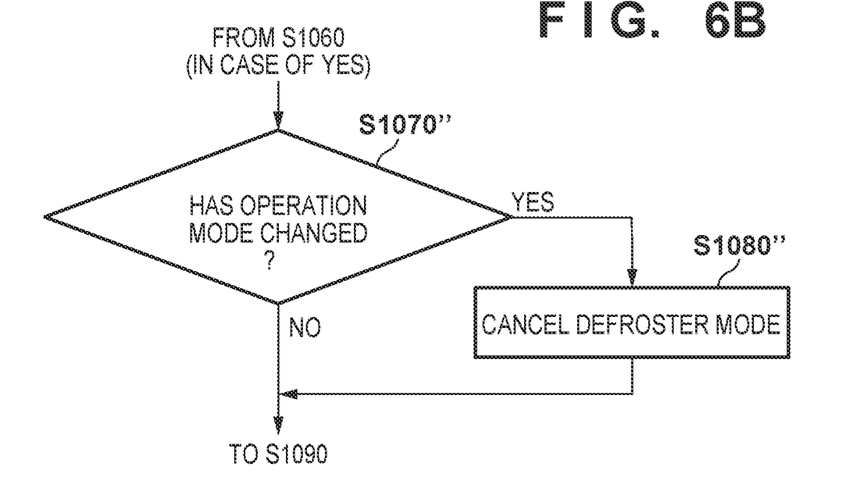
FIG. 6B is a flowchart illustrating an example of the content of control that is performed by the control device.

FIGS. 6A and 6B are portions of a flowchart that shows an example of the content of control that is performed by the control device 16 according to the third embodiment. Note that, in the present embodiment, the air conditioning device 14 may be in an inactive state or in the A/C mode, but is at least not in the defroster mode. S1020 and the preceding steps are the same as those in the first embodiment (see FIG. 4).

As shown in FIG. 6A, if it is determined in S1020 that fog is actually present/there is the possibility of fog being generated in the relatively near future, processing proceeds to S1030. In S1030, whether or not the heating performance of the heating device 152 has decreased is determined. If the heating performance of the heating device 152 has decreased, processing proceeds to S1040", and the operation mode of the air conditioning device 14 is changed to the defroster mode in S1040". Thereafter, processing proceeds to S1050. On the other hand, if the heating performance of the heating device 152 has not decreased, processing proceeds to S1050 without change. S1050 to S1060 are the same as those in the first embodiment.

As shown in FIG. 6B, if it is determined in S1060 that fog removal/fog prevention has been completed, processing proceeds to S1070". In S1070", whether or not the operation mode of the air conditioning device 14 has been changed in S1030 to S1040" is determined. If the operation mode has been changed, processing proceeds to S1080", and the operation mode is returned to the original mode in S1080". Thereafter, processing proceeds to S1090. On the other hand, if the operation mode of the air conditioning device 14 has not been changed, processing proceeds to S1090 without change. S1090 is the same as that in the first embodiment.

Through such control, in the case where it is determined in S1010 that fog removal/fog prevention needs to be performed, if the user does not use/permit the defroster mode, the operation mode of the air conditioning device 14 is changed to the defroster mode under the condition that the heating performance of the heating device 152 has decreased. If a decrease in the heating performance of the heating device 152 has not been detected, the defroster duct 142 is restricted from sending out air. Therefore, according to the present embodiment, air from the defroster duct 142 causes the occupant virtually no discomfort, and it is possible to achieve the same effect as, or a greater effect than, the first embodiment while providing the occupant with a comfortable space in the vehicle.

Others

Although some preferable embodiments have been described above, the present invention is not limited to them, and may be partially modified within the scope of the spirit of the present invention. For example, a part of one embodiment may be combined with another embodiment according to the purpose and so on. Also, the terms that indicate the elements in the present description are only used to illustrate the present invention. The present invention is not limited to the exact meanings of the terms, and includes equivalents thereof as well. For example, although the present description shows the vehicle 1 as a typical example, the content of each embodiment is applicable to vehicles that are not provided with wheels (e.g. ships), i.e. to various movable bodies.

Summary of Embodiments

A first aspect pertains to a movable body (e.g. 1), the movable body including: a monitoring device (e.g. 151) configured to monitor a surrounding environment of the movable body through a window member (e.g. 12F) that is light-transmissive and defines the inside and the outside of the movable body; a heating device (e.g. 152) configured to heat a portion (e.g. 12F1) of the window member within a monitoring area of the monitoring device; an air conditioning device (e.g. 14) configured to perform air conditioning in the movable body; and a control device (e.g. 16) configured to perform drive control on the heating device and the air conditioning device. The monitoring device includes: a detector (e.g. 1511) configured to detect the surrounding environment; and a base member (e.g. 1512, 1512b) that faces an inner wall of the window member, and is disposed such that a detection surface of the detector is located within a space (e.g. SP1) between the base member and the window member, the space is in communication with the inside of the movable body, and when a decrease in heating performance of the heating device is detected, the control device sets the driving force of the air conditioning device to be greater than when a decrease in the heating performance is not detected.

As a result, it is possible to let conditioned air to flow into the above-described space, and it is possible to effectively and relatively easily realize fog removal and fog prevention. Also, it is possible to avoid unnecessarily driving air conditioning device and causing the occupant to feel discomfort.

According to a second aspect, a defroster duct (e.g. 142) is provided in the movable body as a part of the air conditioning device, and when a decrease in the heating performance of the heating device is detected, the control device increases the amount of air from the defroster duct.

Air from the defroster duct may cause the occupant discomfort. Therefore, according to the second aspect, the air is sent out when the heating performance of the heating device has decreased. Thus, it is possible to provide a comfortable space in the vehicle.

According to a third aspect, when the heating performance of the heating device satisfies a criterion, the control device sets the amount of air from the defroster duct to be smaller than when the heating performance does not satisfy the criterion.

With this configuration, it is possible to provide more comfortable space in the vehicle.

According to a fourth aspect, the control device evaluates the degree of fogging on the portion of the window member (e.g. S1010), performs driving control on the heating device and the air conditioning device based on the result of the evaluation (e.g. S1040, S1050).

With this configuration, it is possible to appropriately realize the above-described fog removal/fog prevention.

According to a fifth aspect, the monitoring device is a camera (e.g. 1511) for monitoring an environment in front of the movable body, and the window member is a windshield (e.g. 12F).

That is to say, each of the above-described aspects is desirably applicable to a movable body (typically a vehicle) that is provided with a driving assistance function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A movable body comprising:
a window member that is light-transmissive and defines the inside and the outside of the movable body;
a monitor provided at the inside of the movable body and configured to monitor a surrounding environment of the movable body through the window member;
a heater configured to heat a portion of the window member within a monitoring area of the monitor;
an air conditioner configured to perform air conditioning in the movable body, the air conditioner including a defroster duct; and
a controller configured to perform drive control on the heater and the air conditioner, wherein
the monitor includes:
  a detector configured to detect the surrounding environment; and
  a base member that faces an inner wall of the window member and is disposed such that a detection surface of the detector is located within a space between the base member and the window member, the space being in communication with the inside of the movable body,
the base member includes:
  an abutting portion configured to abut against the inner wall of the window member; and
  a recessed portion recessed with regard to the abutting portion so as to form the space to be narrowed in a height direction and to be widened in a width direction from a rear side to a front side, a surface treatment being applied to an upper surface of the recessed portion to prevent light reflection, and air from the defroster duct flowing into the space from the front side,
the heater is provided in the recessed portion and is further configured to evaluate its heating performance, and
the controller is further configured to
  receive the evaluated heating performance from the heater,
  increase the amount of air from the defroster duct in a case that the evaluated heating performance is decreased, and set the amount of air from the defroster duct to be smaller, in a case that the evaluated heating performance satisfies a criterion than in a case that the evaluated heating performance does not satisfy the criterion.

2. The movable body according to claim 1, wherein the controller is operable to evaluate a degree of fogging on the portion of the window member, and performs driving control on the heater and the air conditioner based on a result of the evaluation.

3. The movable body according to claim 1,
wherein the monitor is a camera for monitoring an environment in front of the movable body, and
the window member is a windshield.

* * * * *